(12) United States Patent
Alarcon et al.

(10) Patent No.: US 10,018,048 B2
(45) Date of Patent: Jul. 10, 2018

(54) T-SHAPED PLATFORM LEADING EDGE ANTI-ROTATION TABS

(71) Applicant: UNITED TECHNOLOGIES CORPORATION, Farmington, CT (US)

(72) Inventors: Andrew G. Alarcon, Manchester, CT (US); Christopher M. Quinn, Middletown, CT (US); James Glaspey, Farmington, CT (US); Matthew A. Turner, Wallingford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 286 days.

(21) Appl. No.: 14/761,360

(22) PCT Filed: Dec. 16, 2013

(86) PCT No.: PCT/US2013/075442
§ 371 (c)(1),
(2) Date: Jul. 16, 2015

(87) PCT Pub. No.: WO2014/143268
PCT Pub. Date: Sep. 18, 2014

(65) Prior Publication Data
US 2015/0337661 A1    Nov. 26, 2015

Related U.S. Application Data

(60) Provisional application No. 61/777,770, filed on Mar. 12, 2013.

(51) Int. Cl.
*F01D 5/02* (2006.01)
*F01D 5/30* (2006.01)
*F01D 11/00* (2006.01)

(52) U.S. Cl.
CPC .............. *F01D 5/02* (2013.01); *F01D 5/025* (2013.01); *F01D 5/30* (2013.01); *F01D 5/3053* (2013.01);
(Continued)

(58) Field of Classification Search
CPC ... F01D 5/02; F01D 5/025; F01D 5/30; F01D 5/3053; F01D 11/008; Y10T 29/49334;
(Continued)

(56) References Cited

U.S. PATENT DOCUMENTS 5,281,096 A    1/1994  Harris et al.
6,481,971 B1  11/2002  Forrester
(Continued)

OTHER PUBLICATIONS

Supplementary European Search Report for Application No. EP 13 87 7503.
(Continued)

*Primary Examiner* — Dwayne J White
*Assistant Examiner* — Justin A Pruitt
(74) *Attorney, Agent, or Firm* — Cantor Colburn LLP

(57) ABSTRACT

Anti-rotation tabs for the platforms in the fan section of a gas turbine engine are provided. The anti-rotation tabs interface with the trailing edge of the spinner, thereby preventing the platform from rotating and twisting.

7 Claims, 1 Drawing Sheet

(52) U.S. Cl.
CPC ........ *F01D 11/008* (2013.01); *F05D 2220/10* (2013.01); *F05D 2220/36* (2013.01); *F05D 2230/60* (2013.01); *F05D 2240/80* (2013.01); *F05D 2260/30* (2013.01); *Y02T 50/671* (2013.01); *Y10T 29/49334* (2015.01)

(58) Field of Classification Search
CPC ............. F05D 2220/10; F05D 2220/36; F05D 2230/60; F05D 2240/80; F05D 2260/30; Y02T 50/671
See application file for complete search history.

(56) References Cited

U.S. PATENT DOCUMENTS

| | | |
|---|---|---|
| 2007/0217915 A1 | 9/2007 | Fujimura et al. |
| 2008/0273980 A1 | 11/2008 | Belmonte et al. |
| 2009/0226318 A1 | 9/2009 | Dimelow |
| 2009/0269202 A1 | 10/2009 | Borzakian et al. |
| 2010/0290910 A1* | 11/2010 | Hoyland ............... F01D 11/008 416/193 R |
| 2011/0076148 A1 | 3/2011 | Fulayter et al. |
| 2012/0148388 A1 | 6/2012 | Bottome |
| 2013/0052012 A1 | 2/2013 | Kray et al. |

OTHER PUBLICATIONS

International Search Report for related PCT Application No. PCT/US13/75442; report dated Apr. 10, 2014.

* cited by examiner

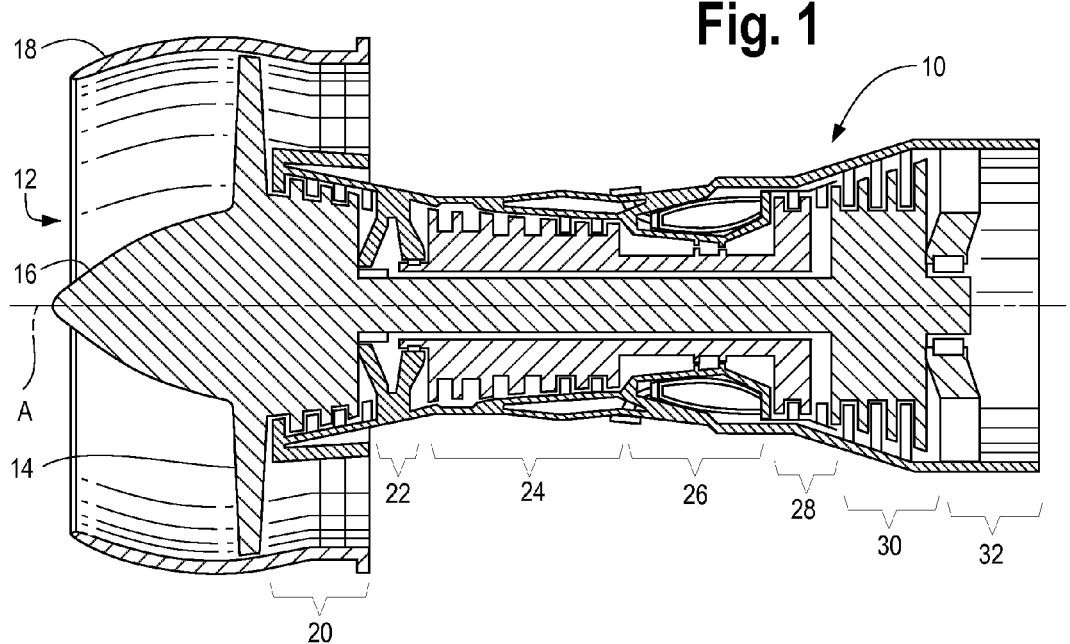
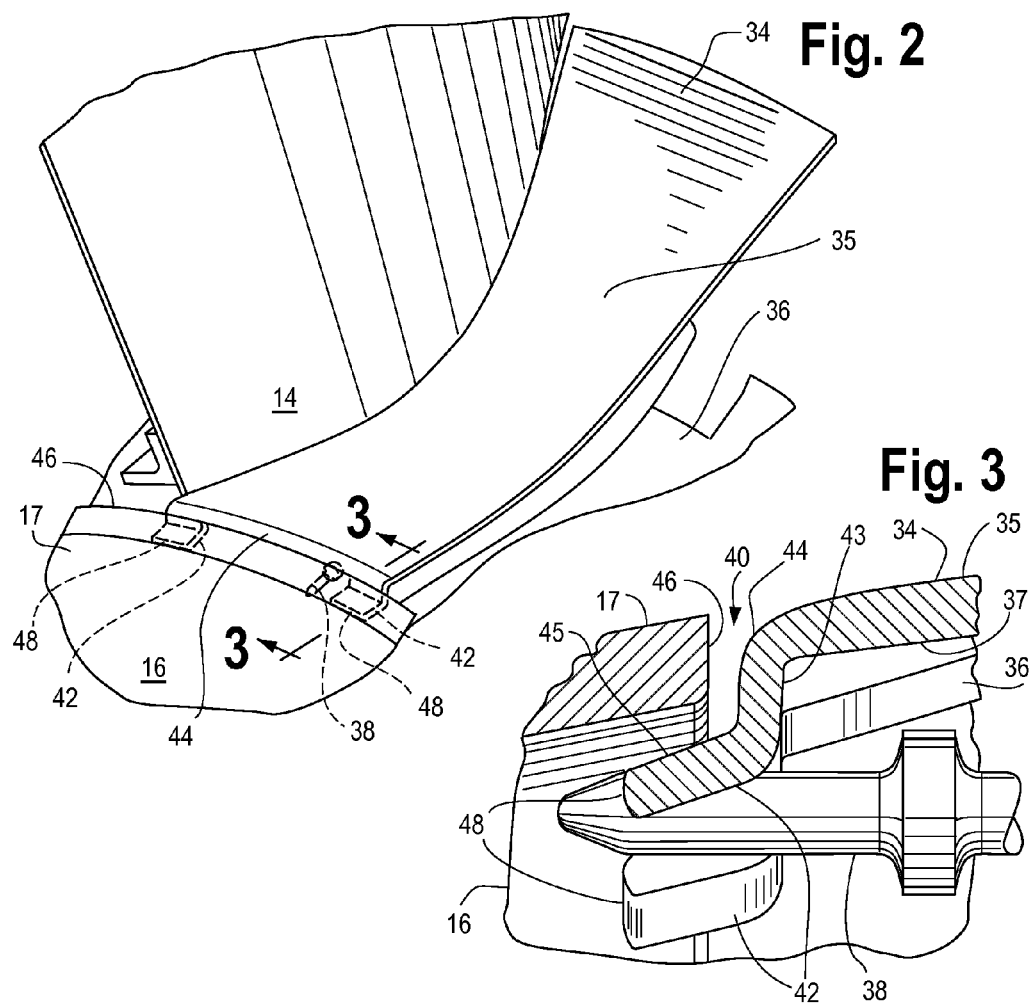

T-SHAPED PLATFORM LEADING EDGE ANTI-ROTATION TABS

CROSS-REFERENCE TO RELATED APPLICATION

This application is a US National Stage under 35 USC § 371 of International Patent Application No. PCT/US2013/075442 filed on Dec. 16, 2013, and claims priority under 35 USC § 119(e) to U.S. Provisional Patent Application Ser. No. 61/777,770 filed on Mar. 12, 2013.

FIELD OF THE DISCLOSURE

The subject matter of the present disclosure relates generally to gas turbine engines. More particularly, the subject matter of the present disclosure relates to anti-rotation tabs which secure the leading edge of a T-shaped platform to the spinner in a gas turbine engine to prevent twisting of the T-shaped platform.

BACKGROUND OF THE DISCLOSURE

Gas turbine engines, such as those used on jet aircraft, generally comprise an air intake port, a fan mounted on a hub near the air intake port and surrounded by a fan case, a low pressure compressor (LPC) section, an intermediate section aft of the LPC section, a high pressure compressor (HPC) section, a combustion chamber or combustor, high and low pressure turbines that provide rotational power to the compressor blades and fan respectively, and an exhaust outlet. The fan and LPC section may be operably connected to the low pressure turbine by an inner drive shaft which rotates about an engine center axis. A cone-like spinner may be mounted over the hub forward the fan blades to help guide air flow.

A series of platforms mounted to the hub between the fan blades define the inner radial boundary of the air flow path and help direct air flow to the LPC. Each platform may be secured to the hub by one or more pins. Since both the spinner and the platforms are attached to the hub, they rotate at the same RPM as the fan blades.

The platforms in some engines have a T-shaped axial cross-section. T-shaped platforms tend to rotate and twist for two reasons: First, the overall center of gravity (CG) of each T-shaped platform is off center with respect to the pin (the point of attachment of the platform to the hub). Second, the "local" CG, i.e., the center of gravity of an axial cross-section of the platform, varies in the axial direction, mainly due to the weight saving manner in which the platforms are made. The changes in overall and local CG can create high stresses and deflections at the leading edge of the platform.

For example, the trailing edge of the platform can twist in one direction and the leading edge can twist the other direction. Twisting of the platform can cause an undesirable change in the shape of the air flow path going into the LPC. Twisting of the platform also can cause air to flow underneath the platform, which can have aerodynamic, structural and heat transfer consequences. And with dense material platforms, due to tolerances, the CG can move around, making predicting the hot (operational) shape of the platform difficult. The present disclosure is directed at solving this problem.

SUMMARY OF THE DISCLOSURE

According to one embodiment of the disclosure, an improved fan assembly for a jet engine is provided. The fan assembly comprises fan blades mounted to a hub, a spinner affixed to the hub upstream of the fan blades and one or more platforms affixed to the hub aft of the spinner. Each platform is secured to the hub by a pin. Each platform may have a center of gravity (CG) that is offset with respect to the pin. The improvement comprises providing one or more tabs extending forward from a leading edge of each platform and interfacing with a trailing edge of the spinner.

The spinner may be a substantially conical structure having an outer surface facing away from the hub and an inner surface facing the hub. The tabs may hook underneath the spinner and contact the inner surface.

Each platform may be interfaced with the spinner by a single arcuate tab extending circumferentially along most of the leading edge of the platform.

Each of the tabs may be substantially L-shaped. Each tab may comprise a first substantially planar section extending radially inward from the platform leading edge and a second section extending axially forward of the first section and terminating in a free edge that extends under the spinner.

In another aspect of the disclosure a method of assembling a fan system for a jet engine is provided. The method may comprise the steps of: attaching fan blades to a hub; positioning platforms having one or more tabs extending from a leading edge of each platform between the fan blades and around the hub; inserting a pin through each platform and through the hub to secure each platform to the hub; and installing a spinner onto the hub so that the spinner extends axially around at least a portion of the pin and all of the tabs.

During the spinner installation step the spinner may be installed so that the tabs interface with the spinner to prevent rotating of the platforms with respect to its respective pin. For example, the tabs may press against the spinner.

In still another aspect of the disclosure a rotating system is provided. The rotating system may comprise a hub, a rotating part (such as a platform) and a co-rotating part (such as a spinner). The rotating part may be secured to the hub by securing means (such as a pin) defining a local axis. The rotating part is free to rotate about the local axis, and may have a center of gravity that is off-center with respect to the local axis. The rotating part comprises a leading edge spaced from the trailing edge of the co-rotating part. The rotating part comprising tabs extending from the leading edge and interfacing with the co-rotating part to minimize rotation and twisting of the rotating part with respect to the securing means. The rotating system may be part of a fan assembly for a gas turbine engine. The tabs may impinge on the co-rotating part. For example, the tabs may hook underneath the co-rotating part.

Although the different examples described herein may have the specific components shown in the illustrations, embodiments of this disclosure are not limited to those particular combinations of components. It is possible to use some of the components or features from one of the examples in combination with features or components from another one of the examples.

BRIEF DESCRIPTION OF THE DRAWINGS

So that the manner in which the concepts of the present disclosure recited herein may be understood in detail, a more detailed description is provided with reference to the embodiments illustrated in the accompanying drawings. It is to be noted, however, that the accompanying drawings illustrate only certain embodiments and are therefore not to be considered limiting of the scope of the disclosure, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which:

FIG. 1 is a longitudinal cross-sectional view of a gas turbine engine in which the anti-rotation tabs of the present disclosure might be used;

FIG. 2 is a perspective view of a platform according to the present disclosure; and FIG. 3 is a close up longitudinal cross-sectional view of a portion of the platform of FIG. 2.

DETAILED DESCRIPTION

In the disclosure that follows certain relative positional terms are used such as "forward", "aft", "upper", "lower", "above", "below", "inner", "outer" and the like. These terms are used with reference to the normal operational attitude of a jet engine and should not be considered otherwise limiting. The forward end of a jet engine generally refers to the air intake port end and the aft end generally refers to the exhaust end. Also, "radially outward" generally refers to a direction away from the engine center axis while "radially inward" refers to a direction toward the engine center axis.

A typical turbofan jet engine works by forcing compressed air into a combustion chamber where it is mixed with fuel and ignited so that the exhaust gases exit a downstream nozzle, thereby creating thrust.

FIG. 1 is a longitudinal sectional view of an exemplary turbofan jet engine 10 that may be equipped with anti-rotation tabs according to the present disclosure. The engine 10 comprises an air intake port 12, fan blades 14 mounted on a hub 36 near the air intake port 12 and surrounded by a fan case 18 which is mounted within an engine housing or nacelle (not shown), a low pressure compressor (LPC) section 20, an intermediate section 22 aft of the LPC section 20, a high pressure compressor (HPC) section 24, a combustion chamber or combustor 26, high and low pressure turbines 28, 30 that provide rotational power to the compressor blades and fan blades 14 respectively, and an exhaust outlet 32, all centered around an engine axis (A). A spinner 16 (cap and body) is mounted over the hub 36 forward the fan blades 14 to help guide air flow. The spinner is a substantially conical structure having an outer surface 17 facing away from the hub 36, an inner surface facing the hub 36 and a trailing edge 46.

Referring to FIG. 2, a series of platforms 34 are mounted to the hub 36 between the fan blades 14. Each platform 34 has a top or aerodynamic surface 35 that defines the inner radial boundary of the air flow path and helps direct air flow to the LPC 20 and a substantially opposed bottom surface 37. Each platform has a leading edge 44 in substantially opposing facing relationship with the trailing edge 46 of the spinner 16.

Each platform 34 may be secured to the hub 36 by a pin 38. The pin 38 may be oriented substantially perpendicular to the platform leading edge 44. At least a portion of the pin 38 may extend forward of (beyond) the leading edge 44 of the platform 34.

The platform 34 shown in FIG. 2 has a T-shaped axial cross-section, where the horizontal portion of the "T" is a circumferential segment that helps define the flow path of the air and the vertical or saddle portion of the "T" extends radially inward from the platform bottom surface 37 and is secured to the hub 36 by the pin 38.

T-shaped platforms tend to rotate and twist for two reasons: First, the overall center of gravity (CG) of each T-shaped platform is off center with respect to the pin (the point of attachment of the platform to the hub). Second, the "local" CG, i.e., the center of gravity of any axial cross-section of the platform, varies in the axial direction, mainly due to the weight saving manner in which the platforms are made. The changes in overall and local CG can cause twist. For example, the trailing edge of the platform can twist in one direction and the leading edge can twist the other direction. Twisting of the platform can cause an undesirable change in the shape of the air flow path going into the LPC. Twisting of the platform also can cause air to flow underneath the platform, which can have aerodynamic, structural and heat transfer consequences. The present disclosure is directed at solving this problem.

Together the spinner 16 and the platforms 34 help define a substantially continuous air flow path from the air inlet 12 to the LPC 20. A gap 40 between the spinner 16 and the platforms 34 may be provided for tolerances.

Tab Structure

Tabs 42 are provided that extend forward from either side of the leading edge 44 of the platform 34. The tabs 42 interface with the trailing edge 46 of the spinner 16, such as by hooking underneath and contacting the inner surface of the spinner 16. In this way the tabs 42 prevent the platform 34, and thus the inner radial boundary of the flow path, from rotating and twisting. The tabs 42 can be formed as an integral part of the platform 34, or can be separate structures affixed to the leading edge 44 of the platform 34. There may be one tab 42, two tabs 42 as shown in FIG. 2, or as many tabs 42 as practical.

Alternatively, an elongated arcuate tab (not shown) may extend circumferentially along most of the leading edge 44 of the platform 34. An elongated tab might avoid the need for a seal between the spinner 16 and the platform 34, but would require some accommodation for the pin(s) 38 to be installed, such as a discontinuity.

FIG. 3 is a close up longitudinal cross-sectional view of the spinner 16 and platform 34 of FIG. 2 taken along line 3-3. The platform 34 is secured to the hub 36 (FIG. 2) by a pin 38.

Each tab 42 may be substantially L-shaped, and may comprise an uppermost surface radially below the platform top surface 35, a first substantially planar section 43 extending radially inward from the platform leading edge 44 and a second section 45 extending axially forward of the first section and terminating in a free edge 48 that extends under the spinner 16.

Alternatively, the tab first section 43 may extend from the bottom surface 37 of the platform 34 and the second section 45 may be attached to the first section 43 and extend beyond the leading edge 44 of the platform 34.

Tab Functions

The tabs 42 work in the following manner. When the platform 34 is subjected to rotating and/or twisting forces, the tabs 42 impinge upon (press against) the spinner 16, thereby minimizing or eliminating rotating and twisting of the platform 34. By adding two or more tabs 42 to the leading edge 44 of each platform 34, rigid body motion and twisting are contained, which minimizes stresses, especially for thin member/feature platforms, and facilitates installation with the spinner 16. The tabs 42 also make the platforms 34 less susceptible to manufacturing-related CG shifts.

Fan System Assembly

The fan system may be assembled as follows. First, the fan blades 14 are attached to the hub 36. Next, the platforms 34 are brought down around the hub 36 and one or more pins 38 are inserted through each platform 34 and through the hub 36 to secure each platform 34 to the hub 36. Next, the spinner 16 is installed. The spinner body fits over both the pin 38 and the tabs 42 as shown in FIG. 3. Finally, the spinner cap is installed.

Industrial Applications

The anti-rotation tabs 42 of the present disclosure prevent twisting of the platforms 34 during operation. The anti-rotation tabs 42 are intended for use in jet engines and, more specifically, commercial turbofan jet engines. However, the tabs 42 may be applicable with any rotating part that is free to rotate about its own, local axis while interfacing with a co-rotating part such as a spinner, to reduce twisting of the rotating part.

While the present disclosure has been shown and described in terms of one or more exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A fan assembly for a jet engine, the fan assembly comprising:
    a hub;
    a plurality of fan blades mounted to the hub;
    a spinner affixed to the hub and having a trailing edge;
    a platform affixed to the hub aft of the spinner and having a leading edge in substantially opposing facing relationship with the trailing edge of the spinner, wherein the platform has an aerodynamic surface located between at least two of the plurality of fan blades;
    a pin securing the platform to the hub, wherein the pin passes through the platform and the hub; and
    a pair of tabs extending forward from either side of the leading edge of the platform, each tab having a first section extending radially inward from the platform leading edge and a second section extending axially forward from the first section, wherein each tab hooks underneath and contacts an inner surface of the spinner in order to prevent the platform from rotating and twisting.

2. The fan assembly of claim 1, wherein:
    the spinner is a substantially conical structure.

3. The fan assembly of claim 1, wherein:
    each platform has a center of gravity that is offset with respect to the pin.

4. The improved fan assembly of claim 1, wherein:
    the tab is substantially L-shaped.

5. The fan assembly of claim 4, wherein:
    each tab terminates in a free edge under the inner surface of the spinner.

6. The fan assembly of claim 1, wherein a portion of the pin extends past the leading edge of the platform.

7. A method of assembling a fan system for a jet engine, the method comprising the steps of:
    attaching fan blades to a hub;
    positioning platforms between each of the fan blades attached to the hub, each of the platforms having a pair of tabs extending forward from either side of a leading edge of the platform, each tab having a first section extending radially inward from the platform leading edge and a second section extending axially forward from the first section;
    inserting a pin through each platform and through the hub to secure each platform to the hub; and
    installing a spinner onto the hub so that the spinner extends axially around at least a portion of the pin and all of the tabs, wherein each tab hook underneath and contact an inner surface of the spinner in order to prevent the platform from rotating and twisting.

\* \* \* \* \*